J. F. WALKER.
AUTOMOBILE FENDER.
APPLICATION FILED MAY 15, 1914.

1,123,961.

Patented Jan. 5, 1915.

2 SHEETS—SHEET 1.

WITNESSES
Samuel E. Dade.
Myron H. Clear.

INVENTOR
James F. Walker
BY Munn & Co.
ATTORNEYS

J. F. WALKER.
AUTOMOBILE FENDER.
APPLICATION FILED MAY 15, 1914.
1,123,961.
Patented Jan. 5, 1915.
2 SHEETS—SHEET 2.
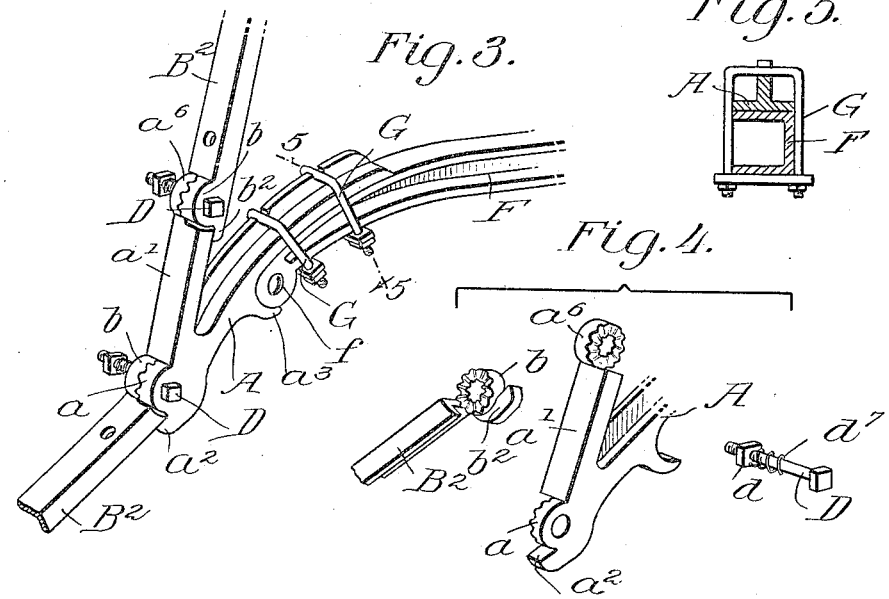
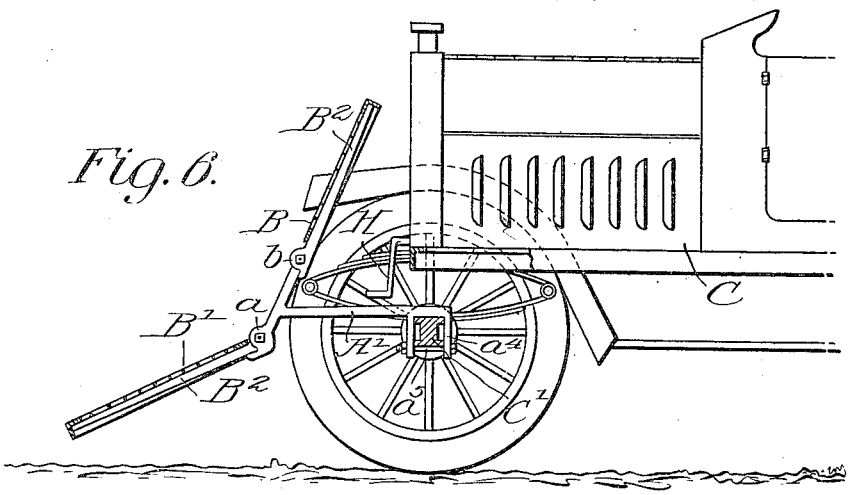
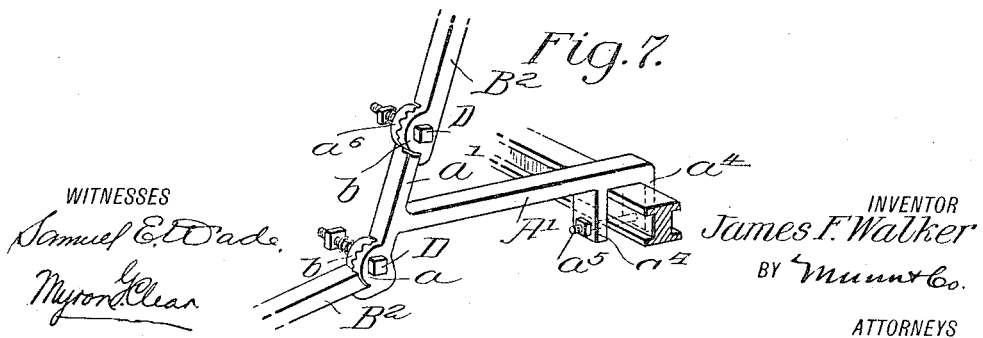
WITNESSES
Samuel E. Wade.
Myron L. Clear.
INVENTOR
James F. Walker
BY Munn & Co.
ATTORNEYS

UNITED STATES PATENT OFFICE.

JAMES F. WALKER, OF QUINCY, ILLINOIS.

AUTOMOBILE-FENDER.

1,123,961. Specification of Letters Patent. Patented Jan. 5, 1915.

Application filed May 15, 1914. Serial No. 838,699.

*To all whom it may concern:*

Be it known that I, JAMES F. WALKER, a citizen of the United States, and a resident of Quincy, in the county of Adams and State of Illinois, have invented an Improvement in Automobile-Fenders, of which the following is a specification.

My present invention relates to automobile fenders, and my object is to provide a fender which will be at once simple and durable in its construction and effective in its operation and which may be readily attached to and detached from a vehicle.

In carrying out my invention I provide a fender including an upper section and a lower section, which are hingedly supported upon brackets readily attachable to and detachable from portions of a motor vehicle and which sections may be supported in various degrees of vertical adjustment and may be folded onto and against one another when desired.

My invention may be better understood, however, from the following detail description in which reference is made to the accompanying drawings, forming a part of this specification, and in which—

Figure 1:
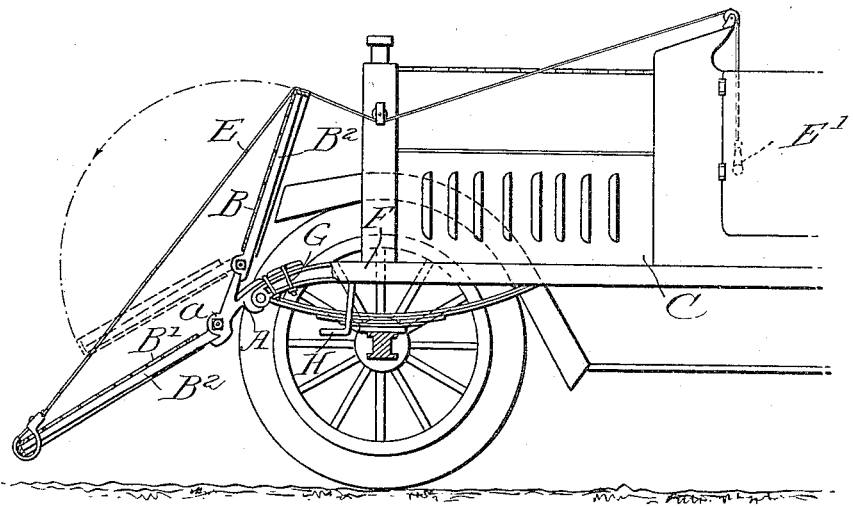
Figure 2:
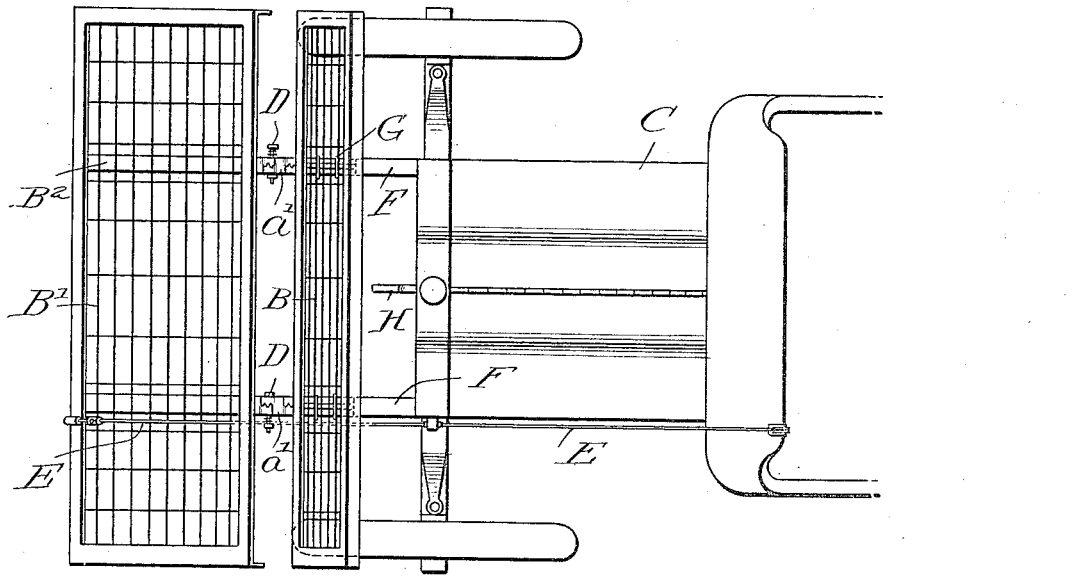

Figure 1 is a view partly in side elevation and partly in vertical section, illustrating the practical application of my invention. Fig. 2 is a plan view of the same, partly broken away. Fig. 3 is a detail perspective view illustrating one of the brackets attached to the forward down-turned end of one of the longitudinal body beams. Fig. 4 is a similar view illustrating portions of the hinged connection in detached relation. Fig. 5 is a detail section taken substantially on line 5—5 of Fig. 3. Fig. 6 is a view similar to Fig. 1, illustrating a slightly modified form of bracket for attachment to the front axle of the vehicle, and Fig. 7 is a detail perspective view of the bracket connected as shown in Fig. 6.

Referring now to these figures, I have shown supporting brackets A in Figs. 1 to 5 inclusive and supporting brackets A' in Figs. 6 and 7 which are differently formed in certain respects to be hereinafter described in order to be readily attached to and detached from the different portions of a motor vehicle, generally indicated at C in Figs. 1, 2 and 6. In each instance, however, the brackets are provided at their forward ends with apertured extensions $a$ having ribs formed radially on one face, and with rigid upwardly and rearwardly inclined arms $a'$ also provided with apertured extensions and having radial ribs. In each instance also the upper and lower sections B and B' of the fender are provided with supporting arms $B^2$, the inner ends of which are provided with apertured extensions $b$ having ribs formed radially upon one face thereof and connected in juxtaposed relation to the similarly ribbed faces of the bracket projections $a$ and $a^6$, bolts D being extended through the alined apertures of the extensions $a$, $a^6$ and $b$ and having nuts $d$ adjustable upon one end thereof and springs $d'$ coiled thereabout between the nuts and the outer faces of the bracket extensions whereby to elastically hold the ribbed faces of the extensions $a$, $a^6$ and $b$ in engagement. This construction enables the sections B and B' of the fender, which are shown in their operative positions in Figs. 1, 2 and 6, and which are held in such position by engaging and coöperating shoulders $a^2$ and $b^2$ at the adjacent ends of the brackets and supporting arms $B^2$, to be held in various adjusted positions to which they may be moved, the lower section being so moved by means of the flexible connection E extended over rollers suitably mounted upon the forward portion of the motor vehicle and provided with a handle E' located within easy reach of the operator of the vehicle.

Each bracket A, as best shown in Figs. 3 and 5, is curved in its length and is provided upon its lower concave side with a rearwardly curved and projecting lug $a^3$ to abut the rounded and down-turned forward end $f$ of one of the spring supporting beams F of the vehicle body, the upper rear portion of the bracket also having notches to receive portions of U-bolts G embracing the rear portion of the bracket and the forward portion of the respective beam F and thus forming a connection which may be quickly and effectively made and detached.

Each bracket A', as shown in Figs. 6 and 7, is provided at its rear end with parallel depending arms $a^4$ spaced sufficiently apart to embrace the front axle C' of the vehicle and having apertures adjacent their lower ends through which a connecting bolt $a^5$ may be extended beneath the axle.

Thus the lower section B' of the fender may be held in various positions with respect to the upper section B in use, through its peculiar hinged connections alone, and the fender as a whole may be readily and quickly attached to and detached from the vehicle as desired. Thus also the upper fender section B may be moved downwardly, when desired, in order that the operator of the vehicle may conveniently reach the crank handle H for starting the engine.

I claim:

1. In a fender of the character described, the combination of supporting brackets having apertured extensions at their forward ends provided with ribs extending radially around their apertures, and having rigid upwardly projecting arms, similarly provided with apertured extensions having radial ribs, an upper fender section, a lower fender section adjacent the lower edge of the upper section, supporting arms secured to the said fender sections and having apertured extensions at their adjacent ends provided with ribs extending radially around the apertures to coöperate with the ribbed faces of the bracket and bracket arm extensions, bolts extending through the apertures of the coöperating extensions and provided with nuts adjustable thereon, springs extending around the bolts and between their adjustable nuts and the inner faces of the extensions, and means whereby to secure the said supporting brackets to the forward portion of the vehicle.

2. In a fender of the character described, the combination of supporting brackets having extensions at their forward ends and provided at their said forward ends with upwardly projecting rigid arms, means for securing the said brackets to the forward portion of a vehicle, an upper fender section hingedly connected to the upwardly projecting arms of the brackets, a lower fender section adjustable with respect to the upper section, supporting arms secured to the lower section and having extensions at their rear ends hingedly connected to the extensions of the brackets, said hinged extensions being provided with relatively engaging ribbed faces, means whereby to elastically hold the ribbed faces of the extensions in engaged position, and means for swinging the lower section of the fender vertically and under control of the operator of the vehicle, all substantially as described.

3. In a fender of the character described, the combination of supporting brackets having apertured extensions at their forward ends provided with ribs extending radially around their apertures, an upper fender section, a lower fender section adjacent the lower edge of the upper section, supporting arms secured to the said fender sections and having apertured extensions at their ends provided with ribs extending radially around the apertures to coöperate with the ribbed faces of the bracket extensions, bolts extending through the apertures of the cooperating extensions and provided with nuts adjustable thereon, springs extending around the bolts and between their adjustable nuts and the adjacent faces of the bracket extensions, means whereby to secure the said supporting brackets to the forward portion of the vehicle, said ribbed extensions having relatively engageable shoulders to rigidly support the fender sections in extended operative position, and means for raising the lower fender section to selected adjusted position and under control of the operator, substantially as described.

JAMES F. WALKER.

Witnesses:
S. A. HUBBARD,
H. E. SCHMIEDESKAMP.

Copies of this patent may be obtained for five cents each, by addressing the "Commissioner of Patents, Washington, D. C."